Sept. 12, 1944.　　　C. CHRISTIANSEN　　　2,357,810
ROOT HARVESTING MACHINE
Filed March 28, 1942　　　3 Sheets-Sheet 3

Inventor,
Christian Christiansen

Patented Sept. 12, 1944

2,357,810

UNITED STATES PATENT OFFICE 2,357,810

ROOT HARVESTING MACHINE

Christian Christiansen, St. Cloud, Minn.

Application March 28, 1942, Serial No. 436,690

11 Claims. (Cl. 55—9)

The invention relates to a new and improved machine designed primarily for harvesting roots.

The principal object of the invention is to provide a simple, inexpensive means for lifting the roots from the ground and cutting the tops off in one operation. By adding additional elevating means the roots and the tops may be placed separately in rows or other suitable conveyances. This machine is pulled over the ground by a tractor or other means of propulsion, thereby saving time and labor in a type of work done mostly by manual labor.

Figure 1:
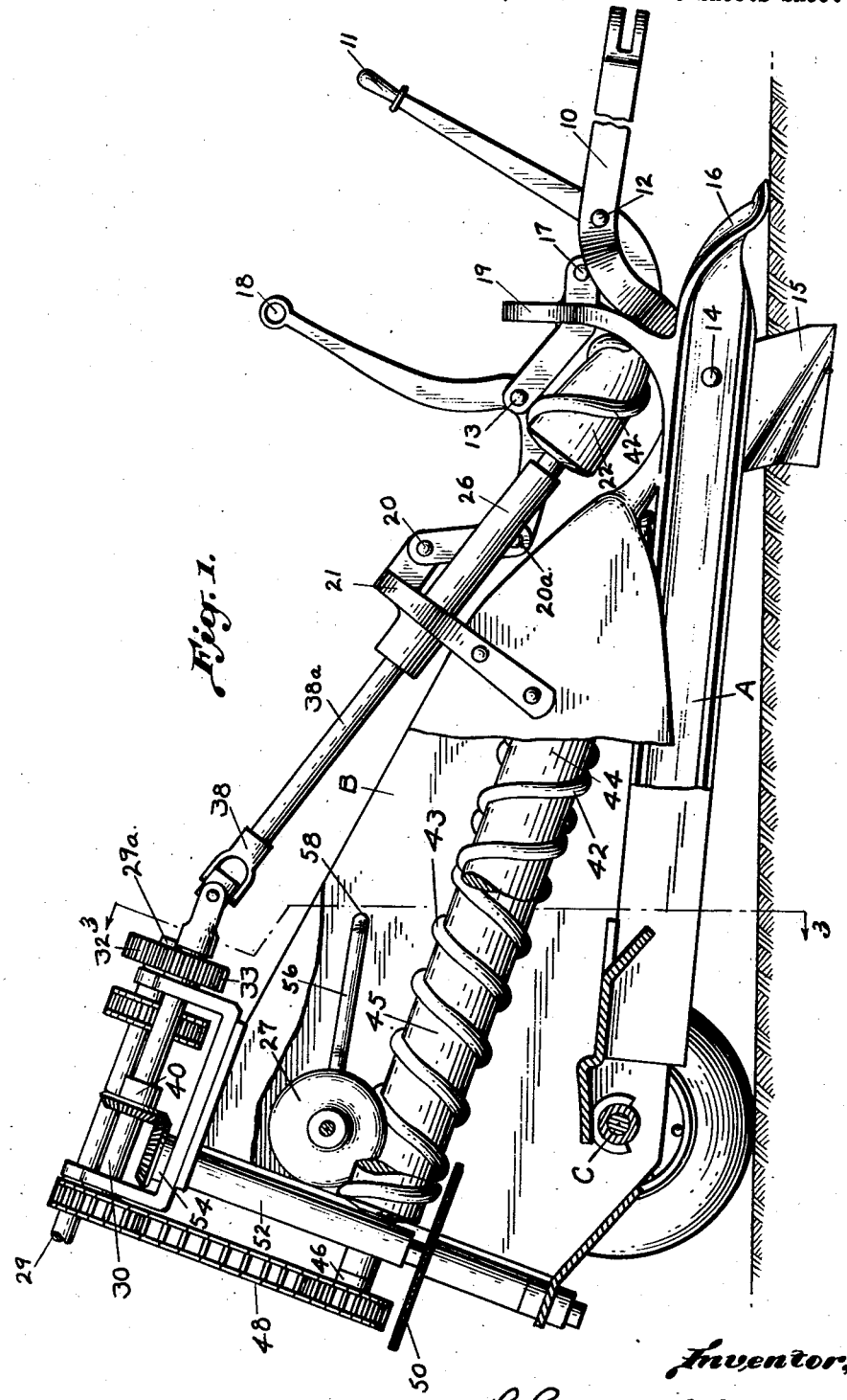

With the foregoing in view, the invention resides in the novel subject matter hereinafter described and claimed, description being accomplished by reference to the accompanying drawings:

Fig. 1. A side elevation of a root topping machine into which drawing is incorporated a sectional view for better understanding of the make-up of the machine.

Figure 2:
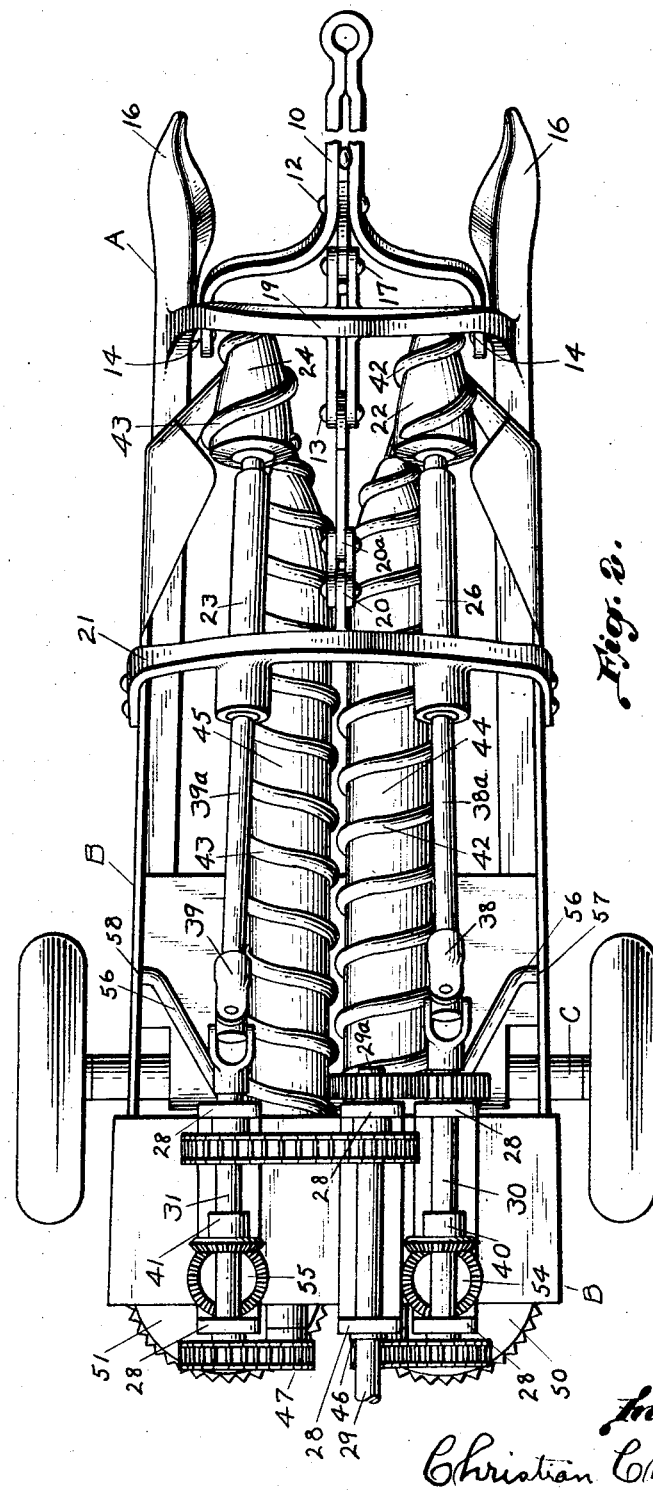

Fig. 2. A horizontal view showing more or less the general lay-out of the machine.

Figure 3:
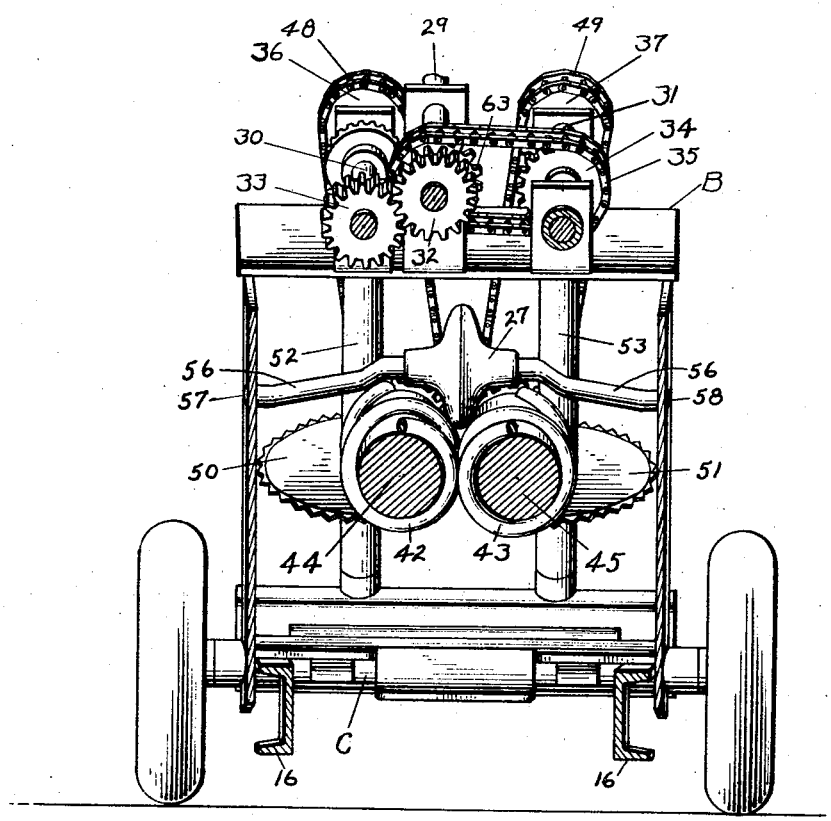

Fig. 3. A vertical transverse sectional view on the line 3—3 of Fig. 1.

One form of construction has been selected for illustration in the present disclosure and will be rather specifically described, with the understanding however, that variations may be made within the scope of the invention as claimed.

I provide a lower inner frame A and an outer upper frame B mounted on a two wheeled axle C to be pulled over the ground straddling the root row to be harvested. The frame A has two straight beams or stringers 16 hinged to the rear axle C at their rearmost ends and at their front ends the beams 16 are tied together with an arch 19. On the lower side and towards the front of each beam 16 is an adjustable root lifting shovel 15 which work the soil on their respective sides of the root. The frontmost part of the beams 16 are tapered downward and outward for the better gathering together of the root tops. Said beams 16 are fastened to a draft beam 10 at 14 for forward propulsion in line with the root row. To adjust frame A with shovels 15 for depth up and down, I use lever 11 (Fig. 1) bolted to the draft beam 10 at 12 and connected by a link at 17 with arch 19. To adjust frame B at the same time as frame A lever 18 is linked with arch 19 of frame A at 13 and with further linkage at 20 and 20a of the arched beam 21 of frame B.

The frame B is square at the rear and hinged on the rear axle C to the outside and above the frame A. The sides of the frame B taper ahead and downwards to the front and are tied together by arch 21 and linked to arch 19 at 13 with lever 18 pivoted to arch 21 at 20 and 20a for raising and lowering the frame B as a separate unit. Therefore by manipulating lever 11 the frames A and B can be lowered and raised in unison for taking care of the variations of the roots and the root tops in the row and for better control of the root tops the frame B can be further manipulated by lever 18.

Mounted on the top of frame B is the driving mechanism consisting of three shafts 29, 30 and 31 (Fig. 2) mounted in the same kinds of adjustable bearings 28 (Fig. 2). Center shaft 29 at its most forward end 29a (Fig. 2) is propelled by the continuation of the said shaft 29 by means of universal joints and other shafts to the power transmitting unit of a tractor or other means not shown in the drawings. The center shaft 29 (Fig. 3) by means of spur gear 32 rotates shaft 30 by means of spur gear 33 and also rotates the outside shaft 31 in the opposite direction of shaft 30 by means of sprocket 63 driving sprocket 34 by means of chain 35. The outside shafts 30 and 31 have sprockets 36 and 37 on their rearmost ends while the frontmost ends are equipped with universal joints 38 and 39 (Fig. 2) respectively. In addition the outside shafts 30 and 31 have bevel gears 40 and 41 (Fig. 2).

As the shaped beams 16 of the frame A gather in the root tops, the shovels 15 loosen the roots. Just above the shaped beams 16 are a set of rollers 22 and 24 (Fig. 2) attached to the lower end of shafts 38a and 39a which are rotated outwardly in adjustable bearings 26 and 23 by means of shafts 38a and 39a connecting with the universal joints 38 and 39 of the driving mechanism. Bearings 26 and 23 are attached adjustably to arch 21 of frame B. The rollers 22 and 24 rotate in opposite outwardly directions on frame B and work in co-operation with the shaped beams 16 on frame A to gather in the root tops to a second set of longer vertical rollers 44 and 45 on frame B located just back of and below rollers 22 and 24 on the frame B. The sets of rollers 22 and 24 and 44 and 45 consist of lengths of tubing or other suitable materials pointed at their front ends which have been inserted into spirals 42 and 43 made of round rods. These spirals 42 and 43 come in sets of rights and lefts and are readily replaced by spirals of more or less turns per foot of roller to accommodate the various root top structures to be elevated.

The rollers 44 and 45 are rotated (outwardly in rear and front adjustable bearings mounted on hangers built into frame B not shown in the drawings) by sprockets 46 and 47 (Fig. 2) at the rearmost ends of the rollers 44 and 45 respectively. Sprockets 46 and 47 are connected by chains 48 and 49 (Fig. 3) to sprockets 36 and 37 of the driving mechanism. Rollers 44 and 45 grasp the tops of the roots which are fed to them by rollers 22 and 24 and the shaped beams 16 of the frame A in such a manner as to hold the root itself firmly against the lower side of rollers 44 and 45 while the screw conveyor action of the rollers 44 and 45 elevate and carry the roots to the rear in such a position that a set of disk knives 50 and 51 set at right angles to the roots can cut the roots from the root tops. Each disk knife 50 and 51 is mounted on an upright shaft 52 and 53. Shafts 52 and 53 (Fig. 3) straddle the rear ends of the rollers 44 and 45 with the disk knives 50 and 51 at their lower ends in cutting position below the rollers 44 and 45 and at the upper ends shafts 52 and 53 have bevel gears 54 and 55 (Fig. 2) rotated by bevel gears 40 and 41 on the driving mechanism. Disk knives 50 and 51 are rotated in mesh inwardly from the front where the roots come in contact with the disk knives 50 and 51 thereby giving a positive cutting action.

To insure holding the root firmly to the under side of the rollers 44 and 45 at the time the disk knives 50 and 51 cut the roots from the tops, the tops of the roots are spread and held firm by a cone shaped roller 27 (Fig. 3) on the top side of the rollers 44 and 45 and in line with rollers 44 and 45. Roller 27 is revolved by the friction caused by the root tops being carried under roller 27 by the screw conveyor action of the rollers 44 and 45. Also, the roller 27 is mounted to an arched shaped shaft 56 linked to the sides adjustably at points 57 and 58 on the frame B.

After the tops are cut from the roots by the disk knives 50 and 51, the roller 27 helps to feed the tops of the roots over the rear ends of the rollers 44 and 45 onto the disk knives 50 and 51. As the motion of the disk knives 50 and 51 is away from the ends of the rollers 44 and 45 at that point, the tops are thrown to either side and down to the ground or to some container for further elevation if so desired. Also, the roots after being cut from their tops drop downward to the ground or to some container for further elevation if so desired.

While excellent results may be obtained from the general relation of elements herein disclosed, I wish it understood that the present showing is for illustrative purposes only and that within the scope of the invention as claimed, numerous variations and refinements may be made.

I claim:

1. A machine for harvesting roots or the like, including a wheeled supporting frame having front and rear ends, a pair of spaced cooperating conveying elements in said frame for engaging the tops of the roots and thereby conveying the latter from the front to the rear end thereof, movable means independent of said conveying elements for gathering the root tops so as to facilitate engagement of the latter by the conveying elements, cutting means cooperating with said conveying elements, pressure means adjacent the cutting means and cooperating with said conveying elements to hold the tops of the roots in engagement with the conveying elements, means for driving the conveying elements, the gathering means and the cutting means, whereby to gather and convey the roots by the tops thereof and to sever said tops from said roots.

2. A machine for harvesting roots or the like, including a supporting frame, a pair of spaced cooperating conveying elements for engaging the root tops and thereby conveying the roots relative to the supporting frame, means for maintaining the root tops in engagement with the conveying elements during at least a portion of their travel relative to the frame, and means for driving said conveying elements.

3. A machine for harvesting roots or the like, including a supporting frame, a pair of spaced cooperating conveying elements for engaging the root tops and thereby conveying the roots relative to the supporting frame, means for maintaining the root tops in engagement with the conveying elements during at least a portion of their travel relative to the frame and means for driving said conveying elements, and thereby to operate the last named means by frictional engagement with said moving root tops.

4. A machine for harvesting roots or the like having tops extending above the surface of the ground, including a supporting frame having a passage for the movement therethrough of the roots to be harvested, a pair of spaced cooperating conveying elements disposed in said passage for engaging a portion of the root and thereby moving the latter through said passage, a second pair of spaced cooperating conveying elements in advance of the forward end of the first-named conveying elements for gathering the tops and feeding the same to the latter, cutting means disposed adjacent the rear end of the first named conveying elements, a gravity actuated rotary member adjacent the rear end of the first named conveying elements above said cutting means for forcing the root tops against said first-named conveying elements, and means for driving all of said conveying elements and cutting means, whereby to remove the roots from the ground and convey the same to and past the cutting means so as to separate the roots from the top portions thereof.

5. A machine for harvesting roots or the like, including a supporting frame having front and rear ends, a pair of spaced cooperating conveying elements in said frame for engaging the tops of the roots and for conveying the latter from the front to the rear thereof, means independent of said conveying elements for gathering the root tops so as to facilitate engagement thereof by the conveying elements, cutting means cooperating with said conveying elements, gravity actuated means cooperating with said conveying elements for forcing the root tops thereagainst, and means for driving the conveying elements, the gathering means and the cutting means whereby to gather and convey the roots by the tops thereof so as to sever said tops from said roots.

6. A machine for harvesting roots or the like having tops extending above the surface of the ground, including a supporting frame having a passage for the movement therethrough of the roots to be harvested, a pair of spaced cooperating conveying elements disposed in said passage for engaging a portion of the root and for moving the latter through said passage, a second pair of spaced cooperating conveying elements in advance of the forward end of the first-named conveying elements for gathering the tops and feeding the same to the latter, gravity actuated means cooperating with said first named conveying elements for forcing the root tops thereagainst, cutting means disposed adjacent the rear end of the first named conveying elements, and means for driving all of said conveying elements and cutting means, whereby to remove the roots from the ground and convey the same to and past the cutting means so as to separate the roots from the top portions thereof.

7. A machine for harvesting roots having tops extending above the ground, including a supporting frame, movable means for conveying the roots by the tops thereof relative to said supporting frame, means for maintaining the root tops in engagement with said movable conveying means during a portion of their travel relative to said frame, and means for driving said movable conveying means.

8. A machine for harvesting roots having tops extending above the ground, including a supporting frame, movable means for conveying the roots by the tops thereof relative to said supporting frame, a member mounted on said frame and movable toward and away from said conveying means for forcing the root tops into engagement with the latter during a portion of their travel relative to said frame, and means for driving said movable conveying means.

9. A machine for harvesting roots having tops extending above the ground, including a supporting frame, movable means for conveying the roots by the tops thereof relative to said supporting frame, a member mounted on said frame and movable toward and away from said conveying means, anti-friction means carried by said member for forcing the root tops into engagement with the conveying means during a portion of their travel relative to said frame, and means for driving said movable conveying means.

10. A machine for harvesting roots having tops extending above the ground including a supporting frame, movable means for conveying the roots by the tops thereof relative to said supporting frame, a substantially U-shaped member pivoted at its ends to the supporting frame, a weighted roller mounted intermediate the ends of the U-shaped member and movable with the latter toward and away from the conveying means for forcing the root tops into engagement therewith during travel of the roots relative to the frame, and means for driving said movable conveying means.

11. A machine for harvesting roots or the like, including a wheeled supporting frame having front and rear ends, a pair of spaced cooperating spiral conveying elements in said frame for engaging the tops of the roots and for conveying the latter from the front to the rear thereof, a pair of spaced cooperating spiral gathering elements disposed above and forwardly of the forward ends of the conveying elements for gathering the root tops so as to facilitate engagement thereof by the conveying elements, cutting means cooperating with the conveying elements, and means for operating all of said elements and the cutting means, whereby to gather and convey said roots by the tops thereof past the cutting means so as to separate the tops from said roots.

CHRISTIAN CHRISTIANSEN.